United States Patent
Park et al.

(10) Patent No.: US 8,932,388 B2
(45) Date of Patent: Jan. 13, 2015

(54) APPARATUS AND METHOD FOR CONVERTING GAS INTO FUEL

(75) Inventors: Jung-Keuk Park, Daejeon (KR); Kwang-Beom Hur, Daejeon (KR); Sang-Gyu Rhim, Daejeon (KR); Jung-Bin Lee, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 937 days.

(21) Appl. No.: 13/048,294

(22) Filed: Mar. 15, 2011

(65) Prior Publication Data
US 2011/0239543 A1  Oct. 6, 2011

(30) Foreign Application Priority Data

Mar. 31, 2010  (KR) .......... 10-2010-0029487

(51) Int. Cl.
*B01D 53/14* (2006.01)
*B01D 53/75* (2006.01)
*B01D 53/52* (2006.01)
*C10L 3/10* (2006.01)
*B01D 53/26* (2006.01)

(52) U.S. Cl.
CPC ....... *C10L 3/103* (2013.01); *B01D 2255/20738* (2013.01); *B01D 53/75* (2013.01); *B01D 2257/80* (2013.01); *B01D 53/52* (2013.01); *C10L 3/106* (2013.01); *B01D 2256/245* (2013.01); *B01D 2257/304* (2013.01); *B01D 53/265* (2013.01); *B01D 2258/05* (2013.01); *B01D 2252/102* (2013.01); *B01D 2253/1124* (2013.01); *B01D 53/266* (2013.01); *B01D 53/1468* (2013.01); *B01D 2253/102* (2013.01)
USPC .......... 96/234; 96/242; 96/265; 96/266; 96/267; 96/355; 95/92; 95/94; 95/136; 95/181; 95/198; 95/235; 95/223

(58) Field of Classification Search
None
See application file for complete search history.

(56) References Cited

U.S. PATENT DOCUMENTS

| | | | | |
|---|---|---|---|---|
| 2,028,713 | A * | 1/1936 | Bartholomew | 423/540 |
| 6,773,555 | B1 * | 8/2004 | Izutsu et al. | 204/157.3 |
| 8,137,655 | B2 * | 3/2012 | Chornet et al. | 423/654 |
| 2011/0247336 | A9 * | 10/2011 | Farsad et al. | 60/685 |

* cited by examiner

*Primary Examiner* — Duane Smith
*Assistant Examiner* — Pankti Patel
(74) *Attorney, Agent, or Firm* — McDermott Will & Emery LLP

(57) ABSTRACT

The present invention is related to an apparatus and a method for converting gas into fuel. The apparatus for converting gas into fuel in accordance with an embodiment of the present invention can include: a first gas processing unit discharging first fuel gas by removing hydrogen sulfide in the raw gas by spraying a solution; a second gas processing unit discharging second fuel gas by removing moisture in the first fuel gas; a third gas processing unit discharging third fuel gas by removing hydrogen sulfide remaining in the second fuel gas; and a solution reservoir supplied with the solution from at least one of the second gas processing unit and the third gas processing unit and storing the solution.

13 Claims, 2 Drawing Sheets

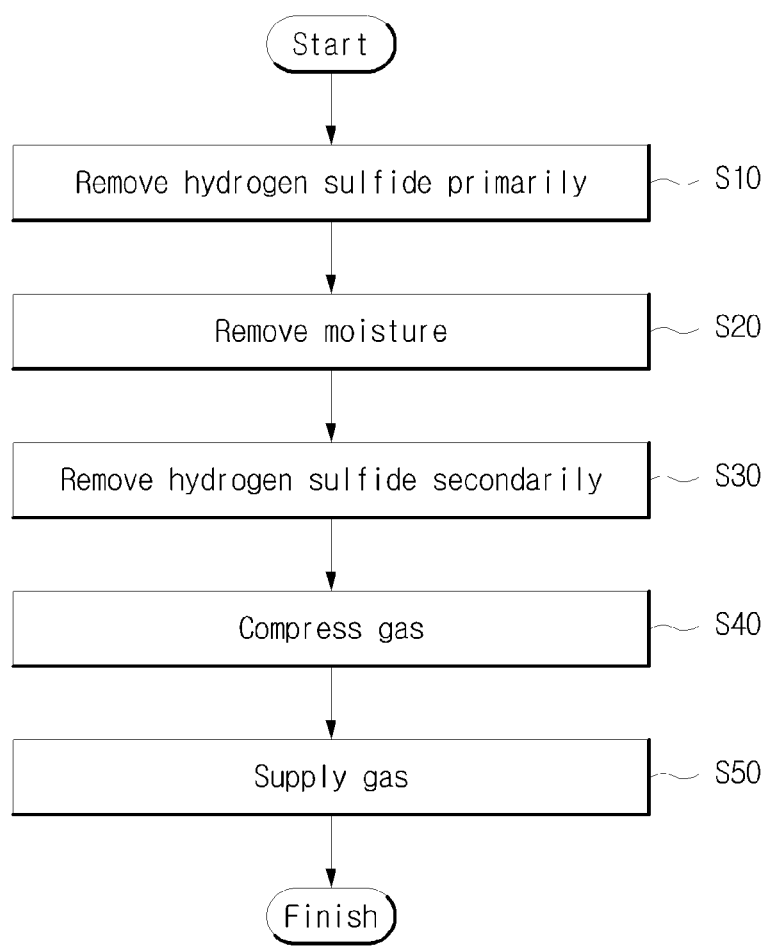

APPARATUS AND METHOD FOR CONVERTING GAS INTO FUEL

CROSS-REFERENCE TO RELATED APPLICATIONS

This application claims the benefit of Korean Patent Application No. 10-2010-0029487, filed with the Korean Intellectual Property Office on Mar. 31, 2010, the disclosure of which is incorporated herein by reference in its entirety.

BACKGROUND

1. Technical Field

The present invention is related to an apparatus and a method for converting gas into fuel.

2. Background Art

With the effectuation of the Kyoto Protocol, nations around the world are making their efforts to reduce greenhouse gas. The fact is that wastes containing large quantities of organic matters such as food wastes, livestock waste water and urban waste water are processed through landfill, incineration, ocean disposal and public facilities. However, the ocean disposal has been banned in the London Dumping Convention, and the landfill and incineration are expected to be increasingly difficult due to environmental reasons, making it more inevitable that large quantities of wastes are processed in public facilities in the future.

Approximately 5,100 tons of livestock wastes are generated annually, and if all of these livestock wastes were processed through anaerobic digestion, 360,000 tons of biogas energy could be generated. If food wastes and urban waste water were also converted into energy, the size of the domestic biogas industry would be enormous.

Generally, biogas containing 35-75% of methane can be immediately utilized as energy through incineration in a boiler. However, if water and other harmful chemicals, such as hydrogen sulfide, ammonia and siloxane, contained in the biogas were not removed, the biogas system could experience lowered efficiency as well as damage and malfunction due to corrosion.

SUMMARY

The present invention provides an apparatus for converting gas into fuel that can reduce the load from a main desulfurization process and save the cost of running a power plant by primarily removing hydrogen sulfide contained in the biogas by use of condensate water in which ammonia is dissolved.

The present invention also provides a method of converting gas into fuel by use of the apparatus for converting gas into fuel.

An aspect of the present invention features an apparatus for converting gas into fuel that removes moisture and contaminant contained in raw gas. The apparatus for converting gas into fuel in accordance with an embodiment of the present invention can include: a first gas processing unit configured to discharge first fuel gas by removing hydrogen sulfide in the raw gas by spraying a solution; a second gas processing unit configured to discharge second fuel gas by removing moisture in the first fuel gas; a third gas processing unit configured to discharge third fuel gas by removing hydrogen sulfide remaining in the second fuel gas; and a solution reservoir configured to be supplied with the solution from at least one of the second gas processing unit and the third gas processing unit and store the solution.

Another aspect of the present invention features a method of converting gas into fuel that removes moisture and contaminant contained in raw gas. The method of converting gas into fuel in accordance with an embodiment of the present invention can include: discharging first fuel gas by removing hydrogen sulfide in the raw gas by use of a solution in which ammonia is dissolved; discharging second fuel gas by removing moisture in the first fuel gas by use of a demister; and discharging third fuel gas by removing hydrogen sulfide in the second fuel gas by use of a desulfurization element.

BRIEF DESCRIPTION OF THE DRAWINGS

FIG. 2 shows a method of converting gas into fuel in accordance with an embodiment of the present invention.

DETAILED DESCRIPTION

Figure 1:
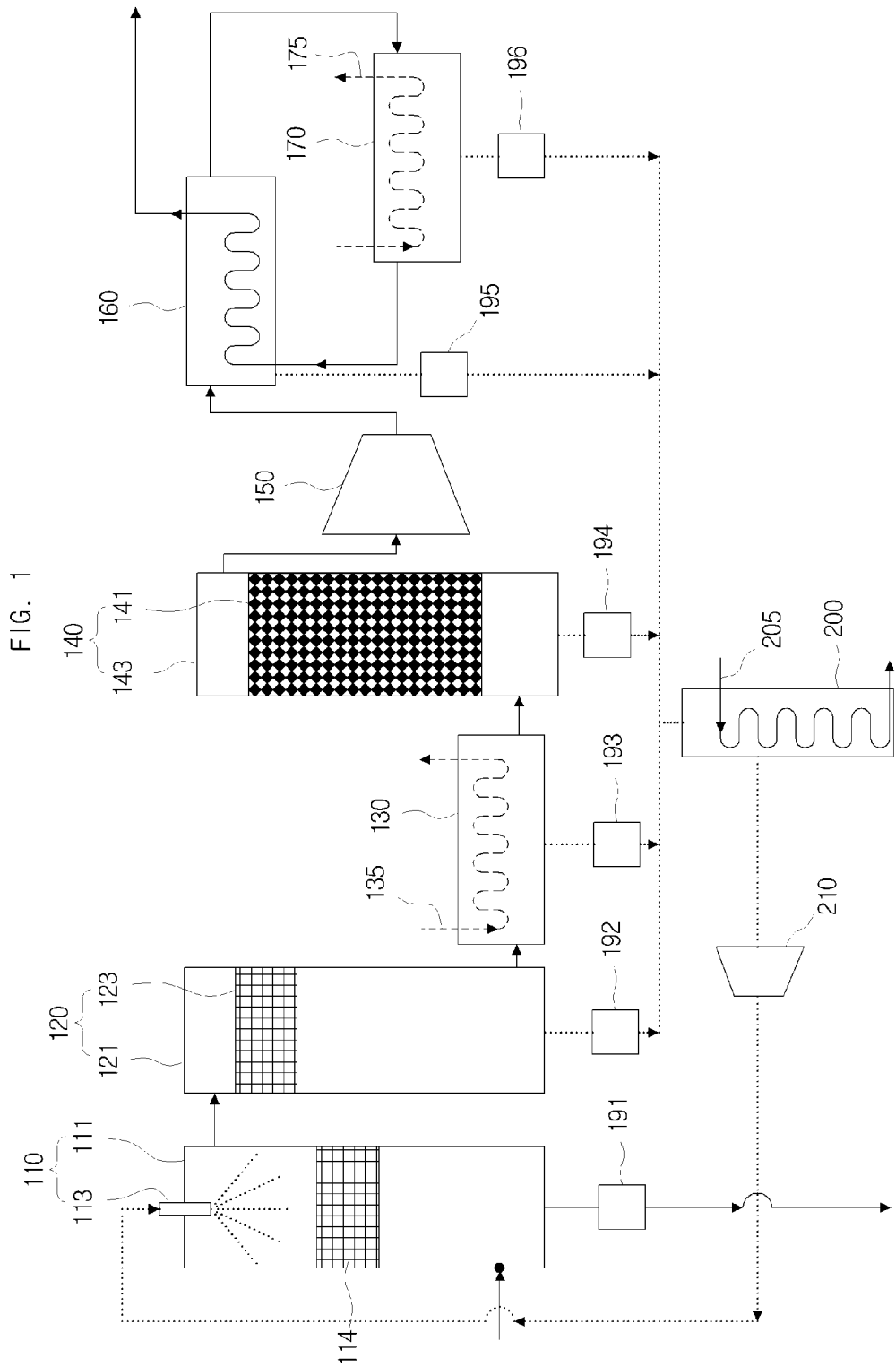
FIG. 1 shows an apparatus for converting gas into fuel in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, an apparatus and a method for converting gas into fuel in accordance with certain embodiments of the present invention will be described with reference to the accompanying drawings.

FIG. 1 shows an apparatus for converting gas into fuel in accordance with an embodiment of the present invention.

Referring to FIG. 1, an apparatus for converting gas into fuel in accordance with an embodiment of the present invention includes a first gas processing unit 110, a second gas processing unit 120, a first gas cooling unit 130, a third gas processing unit 140, a gas compressing unit 150, a heat exchanging unit 160, a second gas cooling unit 170, a plurality of traps 191, 192, 193, 194, 195, 196 a condensate water reservoir 200 and a pump 210. Here, condensate water and the condensate water reservoir correspond to a solution and a solution reservoir, respectively, which will be described through the claims.

The first gas processing unit 110 includes a first gas tank 111, which holds raw gas supplied from outside gas supply equipment (not shown), and a spray device 113, which is coupled to the first gas tank 111 and sprays condensate water into the first gas tank 111. Here, the spray device 113 is supplied with the condensate water, in which ammonia is dissolved, from the condensate water reservoir 200. The condensate water in which ammonia is dissolved will be described later.

The raw gas, which is commonly generated in an anaerobic digestion of organic wastes, includes about 90% or more of methane and carbon dioxide and less than about 5% of oxygen and hydrogen. However, the composition of the raw gas is not restricted to what is described above, and the composition of the raw gas can vary according to the anaerobic digestion process and operation properties of a particular organic waste. The raw gas also contains small amounts of moisture, hydrogen sulfide and ammonia. Moisture can lower the efficiency of a compressor or gas engine that uses gas, and can damage, for example, a turbine rotor in case a micro turbine is used. Hydrogen sulfide has a corrosive property if the moisture content is high, and can damage combustion parts such as the gas engine, boiler and micro turbine. Ammonia is converted to nitrogen monoxide after combustion and forms nitrogen oxide in the atmosphere. Nitrogen oxide formed by ammonia can damage operating parts and shorten the life of combustion equipment such as the gas engine and micro turbine. Accordingly, it is required to remove the minute compositions of moisture, hydrogen sulfide and ammonia contained in the raw gas in order to convert the raw gas into fuel.

The first gas processing unit 110 sprays the condensate water, in which ammonia is dissolved, to the raw gas held in the first gas tank 111 by use of the spray device 113. The spray device 113 sprays the condensate water so that the contact area with the raw gas can be maximized. Moreover, the first gas processing unit 110 also includes a packed material activation member 114, which is installed inside in order to increase the duration of contact between the sprayed condensate water and the raw gas.

The first gas processing unit 110 primarily removes hydrogen sulfide of the raw gas by discharging the condensate water in which hydrogen sulfide is absorbed to a condensate water discharging facility (not shown) or a condensate water processing facility (not shown). Furthermore, the first gas processing unit 110 discharges first fuel gas, in which hydrogen sulfide is primarily removed from the raw gas, to the second gas processing unit 120.

The second gas processing unit 120 includes a second gas tank 121, which holds the first fuel gas discharged from the first gas processing unit 110, and a demister 123, which removes liquid-phase moisture contained in the first fuel gas within the second gas tank 121. The demister 123 filters the liquid-phase moisture contained in the first fuel gas. For example, the liquid-phase moisture contained in the first fuel gas loses its momentum as it passes through the demister 123, and the liquid-phase moisture that lost its momentum flows down to the lower side of the second gag tank 121.

The second gas processing unit 120 discharges second fuel gas, in which the liquid-phase moisture is removed from the first fuel gas through the demister 123, to the first gas cooling unit 130. Moreover, in case the liquid-phase moisture in the first fuel gas that passes through the demister 123 collides with the filler of the demister 123 and flows to the bottom of the second gas tank 121, the second gas processing unit 120 can discharge the liquid-phase moisture to the outside of the second gas tank 121.

The first gas cooling unit 130 cools the second fuel gas, which is discharged from the second gas processing unit 120, by use of a cooling element 135. The first gas cooling unit 130, which cools the second fuel gas, generates condensate water by condensing the moisture contained in the second fuel gas. For example, the first gas cooling unit 130 uses a cooling element 135 such as water or ethylene glycol to cool the second fuel gas to about 10° C. or lower and condense the vapor-phase moisture contained in the second fuel gas. In other words, the first gas cooling unit 130 removes the moisture of the second fuel gas by generating the condensate water through condensing the moisture of the second fuel gas. This first gas cooling unit 130 discharges the condensate water. Moreover, the first gas cooling unit 130 discharges the second fuel gas, from which the moisture is removed, to the third gas processing unit 140.

The third gas processing unit 140 includes a third gas tank 141, which holds the second fuel gas discharged from the first gas cooling unit 130, and a desulfurization element 143, which secondarily removes hydrogen sulfide contained in the second fuel gas within the third gas tank 141.

The desulfurization element 143 includes an absorbent that absorbs hydrogen sulfide or an adsorbent that adsorbs hydrogen sulfide. For example, the desulfurization element 143 can include ferric oxide or active carbon.

The third gas processing unit 140 discharges condensate water generated by condensing moisture in the third gas tank 141 or desulfurization element 143 to the outside. Moreover, the third gas processing unit 140 discharges third fuel gas, in which hydrogen sulfide is removed from the second fuel gas, to the gas compressing unit 150.

The gas compressing unit 150 compresses the third fuel gas discharged from the third gas processing unit 140. For example, the gas compressing unit 150 pressurizes the third fuel gas to about 0.6 MPa or higher. The third fuel gas compressed in the gas compressing unit 150 can have the temperature of about 80° C. or higher.

The gas compressing unit 150 can additionally include an explosion proof device in order to prevent an explosion by methane gas contained in the third fuel gas. If no compression of the third fuel gas is required, the gas compressing unit 150 may not be included or may be substituted by, for example, a blower in an apparatus for converting gas into fuel in accordance with another embodiment of the present invention.

The heat exchanging unit 160 is supplied with the third fuel gas discharged from the gas compressing unit 150 and discharges the third fuel gas to the second gas cooling unit 170 or to outside combustion equipment. Here, the heat exchanging unit 160 makes an exchange between the heat of the third fuel gas supplied from the gas compressing unit 150 and the heat of the third fuel gas supplied from the second gas cooling unit 170. For example, the heat exchanging unit 160 discharges the third fuel gas with the temperature of about 12° C. or higher to outside combustion equipment by making an exchange between the heat of the third fuel gas with the temperature of about 80° C. or higher that is supplied from the gas compressing unit 150 and the heat of the third fuel gas with the temperature of about 5° C. or lower that is supplied from the second gas cooling unit 170.

Like the first gas cooling unit 130, the second gas cooling unit 170 uses a cooling element 175 to cool the third fuel gas discharged from the heat exchanging unit 160. The second cooling unit 170 discharges the cooled third fuel gas to the heat exchanging unit 160.

The traps 191, 192, 193, 195, 195, 196 include a first trap 191, a second trap 192, a third trap 193, a fourth trap 194, a fifth trap 195 and a sixth trap 196. The first trap 191 is coupled to the first gas processing unit 110 to discharge the condensate water to the outside. The second trap 192, the third trap 193, the fourth trap 194, the fifth trap 195 and the sixth trap 196 are coupled to the second gas processing unit 120, the first gas cooling unit 130, the third gas processing unit 140, the heat exchanging unit 160 and the second gas cooling unit 170, respectively, to discharge the condensate water generated therefrom to the condensate water reservoir 200. For example, the traps 191, 192, 193, 195, 195, 196 can include sensors that measure the height of the condensate water and valves that control the discharging of the condensate water. Moreover, in case the condensate water is aggregated over a predetermined amount, the traps 191, 192, 193, 195, 195, 196 can open the valves automatically to discharge the condensate water.

Here, the condensate water discharged from the second to sixth traps 192, 193, 195, 195, 196 has ammonia dissolved therein. In other words, ammonia is dissolved in the condensate water discharged from the second gas processing unit 120, the first gas cooling unit 130, the third gas processing unit 140, the heat exchanging unit 160 or the second gas cooling unit. Since ammonia has the solubility of 400-900 g/kg-water at a temperature between 0° C. and 30° C., ammonia can be dissolved in the condensate water and discharged to the second to sixth traps 192, 193, 195, 195, 196. The second to sixth traps 192, 193, 195, 195, 196 supplied the condensate water, in which ammonia is dissolved, to the condensate water reservoir 200.

The condensate water reservoir 200 stores the condensate water supplied from the first to sixth traps 192, 193, 194, 195, 196. The condensate water reservoir 200 also includes a temperature control device 205, which is capable of controlling the temperature of the condensate water by heating or cooling the condensate water. The condensate water reservoir 200 supplies the stored condensate water to the first gas processing unit 110.

The pump 210 is connected with the condensate water reservoir 200 and the first gas processing unit 110. The pump 210 supplies the condensate water to the first gas processing unit 110 by applying pressure to the condensate water discharged from the condensate water reservoir 200. Here, the pump 210 supplies the condensate water to the first gas processing unit 110 by applying pressure to the condensate water so that the condensate water can be sprayed from the spray device 113 of the first gas processing unit 110.

By primarily removing hydrogen sulfide using condensate water in which ammonia is dissolved, the apparatus for converting gas into fuel in accordance with an embodiment of the present invention can reduce the load of a desulfurization process for converting the raw gas into fuel and save the cost for converting the raw gas into fuel. Therefore, the apparatus for converting gas into fuel in accordance with an embodiment of the present invention lowers the cost of power generation in a power plant that uses raw gas and thus improves the economic feasibility associated with power generation.

FIG. 2 shows a method of converting gas into fuel in accordance with an embodiment of the present invention.

Referring to FIG. 2, the method of converting gas into fuel in accordance with an embodiment of the present invention includes removing hydrogen sulfide primarily (S10), removing liquid-phase moisture (S20), removing hydrogen sulfide secondarily (S30), compressing gas (S40) and supplying the gas to combustion equipment (S50). Here, the method of converting gas into fuel in accordance with an embodiment of the present invention can be carried out by use of the apparatus for converting gas into fuel that has been described with reference to FIG. 1. Accordingly, detailed description of the apparatus for converting gas into fuel will be omitted.

In the step S10, hydrogen sulfide is primarily removed from raw gas, in which moisture, hydrogen sulfide and ammonia are included, by use of condensate water. Specifically, the condensate water, in which ammonia is dissolved, is collected in a condensate water reservoir, and a first gas processing unit is supplied with the raw gas from outside gas supply equipment and stores the raw gas in a first gas tank. Then, the first gas processing unit is supplied with the condensate water from the condensate water reservoir and sprays the condensate water into the first gas tank by use of a spray device. The first gas processing unit discharges first fuel gas, in which hydrogen sulfide is primarily removed from the raw gas by the condensate water, to the outside. Moreover, the first gas processing unit discharges the condensate water, in which hydrogen sulfide is absorbed, to the outside through a trap that is coupled to the first gas processing unit.

In the condensate water used in the step S10, as described earlier with reference to the apparatus for converting gas into fuel, the moisture of first fuel gas, second fuel gas and third fuel gas can be condensed and generated through the step S20, S30 or S50. Here, the condensate water can have ammonia dissolved therein and be stored in the condensate water reservoir.

When hydrogen sulfide of the raw gas is primarily removed in the first gas processing unit, the condensate water in which ammonia is dissolved is supplied to the first gas processing unit from the condensate water reservoir.

In the step S20, the first fuel gas is supplied, and liquid-phase moisture in the first fuel gas is removed by use of a demister. Specifically, a second gas processing unit is supplied with the first fuel gas from the first gas processing unit and stores the first fuel gas in a second gas tank, and the second gas processing unit passes the first fuel gas through the demister to physically filter the liquid-phase moisture in the first fuel gas. Then, second fuel gas, in which the liquid-phase moisture is removed from the first fuel gas, is discharged.

In the step S30, the second fuel gas is supplied, and hydrogen sulfide in the second fuel gas is secondarily removed by use of a desulfurization element. Specifically, a third gas processing unit is supplied with the second fuel gas from the second gas processing unit and stores the second fuel gas in a third gas tank, and the third gas processing unit removes hydrogen sulfide in the second fuel gas by use of the desulfurization element, including an absorbent or an adsorbent. Then, third fuel gas, in which hydrogen sulfide is secondarily removed from the second fuel gas, is discharged.

In the step S40, the third fuel gas is supplied, and the third fuel gas is compressed. Specifically, a gas compressing unit is supplied with the third fuel gas from the third gas processing unit and pressurizes the third fuel gas above a predetermined pressure. For example, the gas compressing unit can pressurize the third fuel gas to 0.6 MPa or higher.

In the step S50, the compressed third fuel gas is supplied to combustion equipment. Here, the third fuel gas can be supplied to the combustion equipment by changing its temperature. Specifically, a heat exchanging unit can be supplied with the compressed third fuel gas from the gas compressing unit and discharges the third fuel gas to a gas cooling unit to cool the third fuel gas, be supplied with the cooled third fuel gas from the gas cooling unit, make a heat exchange between the compressed third fuel gas and the cooled third fuel gas, and then supply the third fuel gas to the combustion equipment. Here, the third fuel gas supplied to the combustion equipment can have an appropriate temperature for the specifications of the combustion equipment.

In the method of converting gas into fuel in accordance with an embodiment of the present invention, the step S40 can be omitted if the compressed third fuel gas is not required in the combustion equipment.

By primarily removing hydrogen sulfide using condensate water in which ammonia is dissolved and secondarily removing hydrogen sulfide using a desulfurization element, the method of converting gas into fuel in accordance with an embodiment of the present invention can reduce the load of a desulfurization process for converting the raw gas into fuel and save the cost for converting the raw gas into fuel.

Hitherto, the present invention has been described with reference to some embodiments. There can be many other embodiments in addition to the described embodiments within the claims of the present invention. It shall be understood by a person of ordinary skill in the art to which the present invention pertains that the present invention can be embodied in modified forms without departing from the essential features of the present invention. Therefore, the disclosed embodiment shall be understood in a descriptive perspective, not a restrictive perspective. The scope of the present invention is disclosed in the appended claims, not in the above description, and it shall be interpreted that all differences within the equivalent scope are included in the present invention.

What is claimed is:

1. An apparatus for converting gas into fuel, the apparatus removing moisture and contaminant contained in raw gas, the apparatus comprising:
   a first gas processing unit configured to discharge first fuel gas by removing hydrogen sulfide in the raw gas by spraying a solution;
   a second gas processing unit configured to discharge second fuel gas by removing moisture in the first fuel gas;
   a third gas processing unit configured to discharge third fuel gas by removing hydrogen sulfide remaining in the second fuel gas;
   a solution reservoir configured to be supplied with the solution from at least one of the second gas processing unit and the third gas processing unit and store the solution;
   a first gas cooling unit connecting the second gas processing unit with the third gas processing unit and being configured to remove moisture by cooling the second fuel gas; and
   a heat exchanging unit being connected to the third gas processing unit and being configured to discharge the third fuel gas by changing the temperature of the third fuel gas.

2. The apparatus of claim 1, wherein the first gas processing unit is configured to be supplied with the solution from the solution reservoir and spray the solution to the raw gas.

3. The apparatus of claim 1, wherein the solution is condensate water containing ammonia generated by the second gas processing unit, the third gas processing unit, the first gas cooling unit and the heat exchanging unit.

4. The apparatus of claim 1, further comprising a second gas cooling unit connected to the third gas processing unit and being configured to remove moisture by cooling the third fuel gas and to discharge the cooled third fuel gas to the heat exchanging unit.

5. The apparatus of claim 4, wherein the heat exchanging unit is configured to make an exchange between the heat of the third fuel gas supplied from the third gas processing unit and the heat of the third fuel gas supplied from the second gas cooling unit.

6. The apparatus of claim 1, wherein the first gas processing unit comprises:
   a first gas tank configured to hold the raw gas; and
   a spray device coupled to the first gas tank and configured to spray the solution.

7. The apparatus of claim 1, wherein the second gas processing unit comprises:
   a second gas tank configured to hold the first fuel gas; and
   a demister installed inside the second gas tank and configured to remove moisture from the second fuel gas.

8. The apparatus of claim 1, wherein the solution reservoir further comprises a temperature control device configured to control the temperature of the solution.

9. The apparatus of claim 1, wherein the third gas processing unit comprises:
   a third gas tank configured to hold the second fuel gas; and
   a desulfurization element installed inside the third gas tank and configured to remove hydrogen sulfide remaining in the second fuel gas.

10. The apparatus of claim 9, wherein the desulfurization element comprises at least one of an absorbent absorbing the hydrogen sulfide and an adsorbent adsorbing the hydrogen sulfide.

11. The apparatus of claim 1, further comprising a pump connected to the solution reservoir and configured to apply pressure to the solution and supply the solution to the first gas processing unit.

12. The apparatus of claim 1, further comprising a gas compressing unit configured to pressurize the third fuel gas and discharge the compressed third fuel gas.

13. The apparatus of claim 1, further comprising a trap coupled to at least one of the first gas processing unit, the second gas processing unit and the third gas processing unit and configured to discharge the solution to the outside or to the solution reservoir.

* * * * *